United States Patent [19]
Kendall et al.

[11] 3,755,213
[45] Aug. 28, 1973

[54] POROUS RESIN BONDED PRODUCT

[75] Inventors: Virgil D. Kendall, Springfield; Rudolph A. Skriletz, Marysville, both of Ohio

[73] Assignee: Wallace-Murray Corporation, New York, N.Y.

[22] Filed: Mar. 22, 1971

[21] Appl. No.: 126,942

[52] U.S. Cl. ...... 260/2.5 EP, 260/2.5 N, 260/2.5 F, 260/37 R, 260/37 EP, 260/37 M, 260/37 N, 260/37 PC, 260/39 R, 260/39 M, 260/39 SB, 260/40 R, 264/331, 264/DIG. 5 D
[51] Int. Cl. .............................................. C08j 1/14
[58] Field of Search ...................... 260/2.5 M, 2.5 F, 260/2.5 EP; 264/122; 18/42

[56] References Cited
UNITED STATES PATENTS

| | | | |
|---|---|---|---|
| 2,987,482 | 6/1961 | Oliva | 260/2.5 EP |
| 3,129,191 | 4/1964 | Nickerson et al. | 260/2.5 EP |
| 3,198,756 | 8/1965 | Richter et al. | 260/2.5 EP |
| 2,653,139 | 9/1953 | Sterling | 260/2.5 F |
| 2,608,536 | 8/1952 | Sterling | 260/2.5 F |

*Primary Examiner*—John C. Bleutge
*Assistant Examiner*—Morton Foelak
*Attorney*—Birch, Swindler, McKie & Beckett

[57] ABSTRACT

An improved rigid, porous product and process for making such product are disclosed. The product comprises a particulate material bound by a thermosetting resin and characterized by uniformly distributed and interconnecting porosity. The body initially is made by isostatic pressing of a mixture of the particulate material and resin and, inter alia, the cured body is suitable for use as a die, mold or filtering device.

11 Claims, 1 Drawing Figure

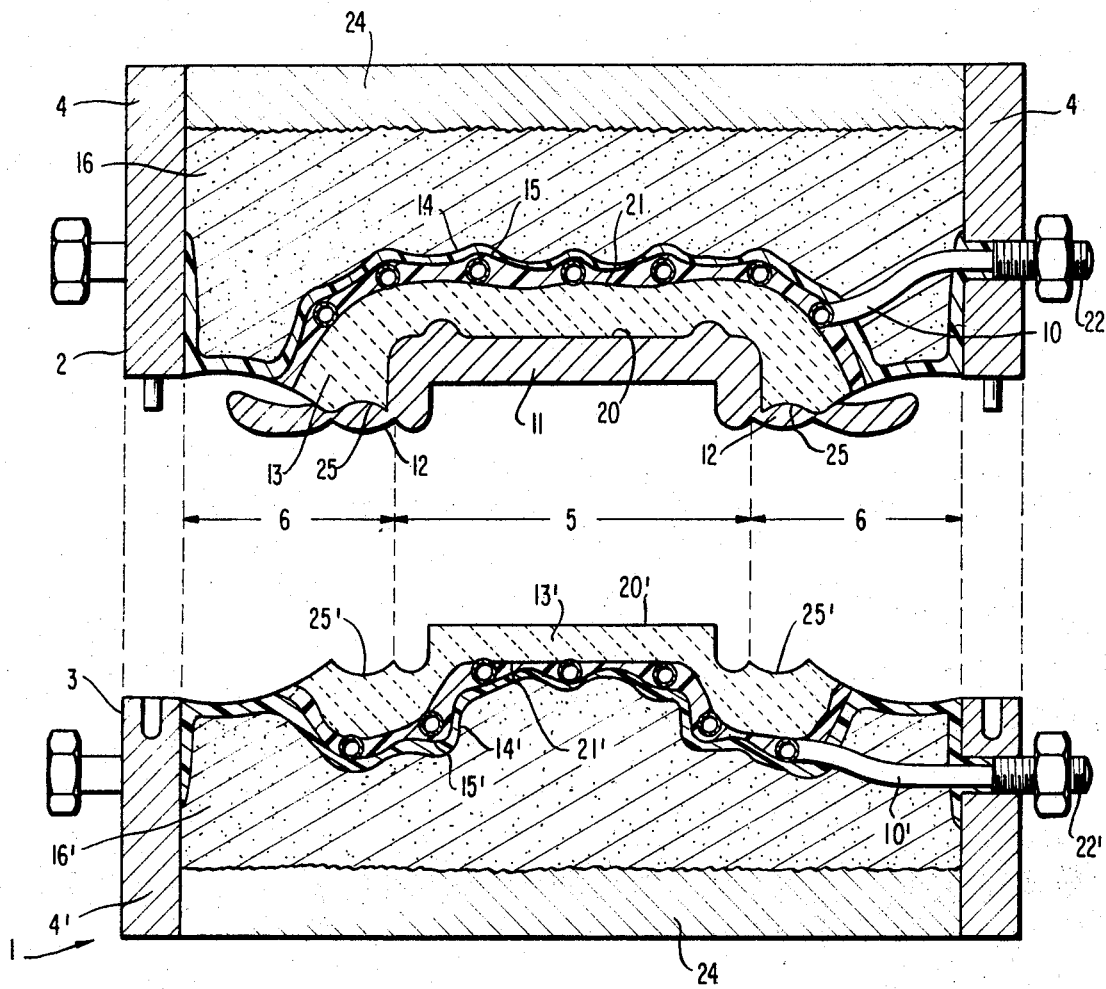

POROUS RESIN BONDED PRODUCT

This invention relates to an improved rigid, porous product for use as a die, mold, filtering media, or the like, and a method for making such products. More particularly, the invention relates to a uniformly porous body of enhanced structural strength and durability, particularly useful in the construction of molds, dies, filtering media and the like and a method for making such products.

Porous structure for use as molds, dies, filtering media and the like heretofore have been prepared from a major portion of an inorganic material such as metal particles or metal or metalloid oxides or salts. These prior art structures, however, have suffered from a number of disadvantages among which are insufficient porosity, non-uniform porosity and an inability to reproduce the contour and surface texture of a desired pattern. Prior art molds or dies have been made, for example, by sintering metal particles together to make a porous structure. Such sintering, however, required the use of high temperatures in order to obtain an adequate particle-to-particle bond. Accordingly, undesirable shrinkage and distortion of the piece frequently have occurred.

Porous rigid articles of the type described also have been formed by employing a thermosetting resin as a binder for particles of inert metal material having the desired characteristics. Fo example, U.S. Pat. No. 3,166,615 to Farrell discloses a porous body wherein inert particles are coated with a fluid thermosetting resin dissolved in volatile solvent. The solvent subsequently is partially removed, leaving the individual particles coated with the resin. The particles then are compacted by light manual pressure to form the desired shape and the piece is cured by a progressive heating and holding technique at temperatures from about 100° to 350°F. to effect curing of the resin and expel solvent. Unfortunately, this process has been found to introduce undesirable variations in porosity across the length and depth of a piece. Moreover, the use of curing temperatures of above about 125°F. have been found in many instances to produce distortion. While distortion may be somewhat reduced at lower forming temperatures, unfortunately even slight distortion has been found undesirably to reduce the desired accuracy in many molding operations. Moreover, the use of volatile solvent in the formation of such bodies has presented operating difficulties since it has been essentially impossible to control solvent removal to obtain the desired uniform porosity.

It is an object of this invention to provide a method of forming rigid, uniformly porous structures for use as molds, dies, filtering media and the like without use of volatile solvents or other components which may migrate during the useful life of the body to adversely affect its performance and a method for production of such bodies.

It is a further object of this invention to provide porous, durable structures having substantially uniform porosity which are suitable for extended use as molds or dies in the formation of green ware by a pressing operation.

It is a further object of the invention to provide a porous, durable structure having substantially uniform porosity which is suitable for extended use in the formation of green ware by a pressing operation in which the green ware uniformly may be released from the molding surfaces by forcing fluid through the porous face of the molding surface.

It is another object of this invention to provide a die body containing a porous die liner having enhanced ware releasing characteristics and a method for making the die body.

Generally described in terms of product, this invention relates to a porous, rigid body of inert filler particles bound by a thermosetting resinous material, said inert filler particles having a Moh hardness greater than about two, the resin being present in the mixture in an amount by volume which corresponds to an amount of from about 13 to about 28 percent by weight of the mixture when the inert filler is alumina, said body having from about 15 to about 40 percent porosity substantially uniformly distributed and substantially interconnected throughout said body. Generally described in terms of process, the present invention comprises a method for forming a porous, rigid body which comprises mixing finely divided solid particles of an inert filler material having a Moh hardness greater than about two with a liquid thermosetting resinous binder, the resin being present in the mixture in an amount by volume which corresponds to an amount of from about 13 to about 28 percent by weight of the mixture when the inert filler is alumina, and curing said mixture under isostatic pressure greater than about 250 p.s.i. at a temperature below that at which said resin will thermally degrade until the resin has cured at least to the point where the formed body is self-supporting. Preferably the body is removed from the isostatic chamber shortly after it has been cured to the self-supporting state and stored under conditions requisite to complete curing of the resin to the desired degree. If desired, complete curing can be effected in the isostatic chamber rather than in a subsequent step. However, since such a procedure necessarily will tie up the isostatic chamber, it is preferred that curing beyond that necessary to render the piece self-supporting, subsequently be effected outside the chamber. This second period of curing will, of course, vary in length with the storing temperature as well as with the amount and type of catalyst employed.

The invention also relates to a die member comprising a die casing; a porous die liner having a mold surface and a back surface in the die casing; a ware releasing unit attached to the back surface of the die liner, the ware releasing unit including a foraminous portion in fluid communication with the said back surface of the porous die liner and a fluid introducing portion extending through a wall of the die casing; a non-porous sealant coating applied over the back surface of the die liner and attached ware releasing unit; and non-porous bulk filler material filling the remaining portion of the die casing.

The invention also relates to a method for forming a die body having improved ware releasing characteristics comprising forming a porous die liner having a mold surface and a back surface; attaching a ware releasing unit which includes a foraminous portion to the said back surface of the porous die liner, the foraminous portion of the ware releasing unit being in fluid communication with the said back surface; applying a non-porous sealant coating over the said back surface of the die liner and attached ware releasing unit; and applying non-porous bulk filler material over the coated die liner in an amount sufficient to form a die body of the desired configuration.

The curved products produced in accordance with the invention generally will possess from about 15 to about 40 percent porosity, uniformly distributed and substantially interconnected throughout the body. For use as porous molds or die bodies, a porosity from about 18 to about 28 percent is preferred.

The products of this invention are particularly suitable for use as die bodies, molds or filtering media. However, the products of this invention also may be employed in other applications where rigid, structurally strong bodies of uniform porous structure are advantageous. When the filler particles are metallic, the body suitably may be employed as a stamping mold. The product of the invention is eminently satisfactory for use in the construction of jiggering molds. The product of this invention also suitably may be used as a mold in vacuum-forming processes.

The product of this invention is particularly advantageous when used as a die body in molding methods employing fluid pressure for release of green ware from the die surface. Such a method is shown in U.S. Pat. No. 2,584,109 to Blackburn et al. Accordingly, a preferred embodiment of the invention will be described with reference to the accompanying FIGURE which illustrates a die especially adapted for use in the plastic pressing method disclosed in the Blackburn et al. patent. Referring to the FIGURE, a die assembly generally indicated as 1 is composed of an upper, female die member 2 and a lower or male die member 3. The female die member 2 is composed of a mold surface 4 and a backing set in die casing 4. The die liner 13 is formed in accordance with subsequently presented Example 1 or 4. As shown in the FIGURE, the die liner 13 has a mold surface 20 constituting an accurate representation of the piece to be molded and backing surface 21 adjacent the mold surface 20 and gutter forming surface 25. In the FIGURE, the die is shown open, i.e., in the condition prevailing subsequent to the pressing operation. A formed piece 11 is shown in contact with mold surface 20 and gutter forming surface 25 of the die liner 13. The pressed ware and gutter piece 12 which have been formed during the pressing operation by the extrusion of excess molding material out of the forming area into the gutter area.

A ware release unit 10 is attached to the back surface 21 of the die liner 13 by suitable means indicated at 14 such as a cured, thixotropic epoxy resin paste 14. The ware release unit 10 including a foraminous portion in fluid communication with the back surface 21 of the porous die liner 13 is typically composed of a length of tubing extending through the die casing 4 and attached to a suitable fluid introducing means such as nipple 22 which can be connected to a suitable source (not shown) of a fluid releasing agent, such as compressed air. Selected portions of the ware release unit 10 are, as noted before, porous and in fluid communication with the porous die liner 13 so that the pressed gas or other suitable fluid supplied to the tube or ducts will be forced through the porous die liner 13. The releasing unit 10 appropriately is positioned so that gas will be discharged through the molding surface 20 of the die liner which is in contact with the pressed plastic body, such as clay.

A surface coating 15, preferably a cured resinous composition and most preferably a cured thixotropic epoxy resin, can be applied over the paste 14. The bulk of the die member 2 is composed of a mixture of inexpensive bulk filler material 16, preferably a mixture of sand and gravel or similar relatively coarse particle material containing a suitable binder for a solid body. The filler material 16 can be formed by mixing sand and gravel with any suitable binder, such as an epoxy resin, and pouring the mixture around the die liner and ware releasing unit in the die casing. The uppermost portion of the filler material 16, can, if desired, be composed of an even more inexpensive filler 24 such as gypsum cement. At least paste 14, coating 15 and filler 24 (and also preferably filler 16) are non-porous to prevent passage of release fluid other than through the mold face.

The lower or male die member 3 is similarly constructed. Those portions of the male die member corresponding to the female die member are indicated by prime numerals with corresponding numerals indicating corresponding parts. As further shown in the drawings, the die assembly is composed of a forming area 5 and a gutter area 6.

The method of forming the die member as above set forth also is useful in preparation of porous die bodies such as shown in U.S. Pat. Nos. 3,384,499 and 3,389,001 which are characterized by improved self-cleaning characteristics.

In conducting a molding operation with the structure shown in the Figure, a relatively highly plastic molding mixture is prepared utilizing conventional mixing techniques. The molding material normally may comprise a mixture of various clays and finely divided mineral substances. However, the molding material alternatively may comprise any desired molding composition used by the art. In pressing articles such as vitreous china sanitaryware, molding materials generally are comprised by weight of 26–35 percent ball clays, 14–20 percent kaolin clays, 0–23 percent nepheline syenite, 0–37 percent feldspar, 0–50 percent sand spar and 2 to 20 percent flint. Other plastic mixtures also are suitable for use in molding procedures utilizing a mold or die of the material of the present invention.

The liquid mixed with the molding material preferably is water where clay forms a major component of the mixture. The amount of water mixed with the solid material will vary in accordance with the plastic properties desired in the specific molding material employed. The plasticity of the molding material may be controlled by addition of organic or inorganic binders such as alginate, vee gum or bentonite. Generally, when such a binder is added to the mixture, the amount of liquid required to obtain requisite plasticity may be reduced. In a pressing operation employing molds such as those shown in the Figure, a quantity of the desired molding composition is pressed between the mating male and female dies which are mounted in a suitable press. The ceramic molding mixture is pressed between dies 13 and 13' to form the shape of the article to be made. When the dies are brought together under suitable pressure, the molding mixture flows within the cavity defined between the pressing surfaces of the dies, insuring that the consistence of the pressed article is uniform throughout. Excess molding mixture flows into the gutter areas of the dies for subsequent removal.

After the dies have been brought together to form the pressed piece 11, fluid pressure is forced through one of the ware releasing units, such as ware releasing unit 10', immediately prior to the release of the molding pressure. Fluid pressure thus passes through the unit 10' and the pores of die liner 13' and mold surface 20' of the male die to effect a rapid and uniform separation of the green pressed tank from the male die. During the pressing operation, some of the liquid contained in the ceramic material-liquid mixture is forced into the permeable pressing bodies 13 and 13'. The gas thereafter forced through the body not only effects separation of the green pressed tank from the molding surface, but also purges some of the liquid absorbed by the body during the pressing operation. Die assemblies 2 and 3 are separated, preferably by raising female die 2 away from male die 3. The female die 2 may be moved to a desired point before conducting the release operation to separate the pressed piece 11 from the die liner 13.

The tank 11 is separated from female die 2 by forcing compressed gas through ware releasing unit 10 and thus through die liner 13 to the mold surface 20. The compressed gas purges absorbed liquid in die liner 13 in the manner described above with respect to die liner 13'. The green pressed tank 11 is then removed from between dies 13 and 13', and may be further processed or, if desired, may be used in its green-pressed state.

The successful operation of a die assembly shown in the Figure is dependent upon uniform and interconnected porosity of the resin bonded inert filler particle die. There must be sufficient porosity to allow the fluid releasing agent to permeate from the conduits 10 and 10' through to the die surface. Such permeation requires interconnecting pores from the back surface of the die where the release unit is located to the die surface where the piece is formed. Release of the ware requires a degree of uniform porosity requisite to deliver sufficient pressurized fluid from the die face to achieve quick, even release without setting up strains in the ware. Strains in the green ware too often manifest themselves as cracks or weak areas in the fired ware.

The finely divided solid particles of the inert filler material employed in preparation of the porous bodies of the invention may be any inorganic, solid finely divided material having a MoH hardness greater than talc, i.e., a Moh hardness of at least about two. The filler particles can be, for example, any one of a number of suitable materials such as metal or metalloid salts and oxides including naturally occurring minerals, metals, alloys and ceramic materials. Such materials include alumina, silica, zirconia, quartz, sand, anatase, rutile, ilmenite, hematite, magnetite, boron carbide, zirconium carbide, iron silicide, cobalt silicide, zirconium silicate, tungsten carbide, silicon carbide, iron, nickel, copper, aluminum and the alloys thereof, glass, pottery, fire bricks and the like. The particles generally will be less than about 150 microns in size and preferably will have a particle size of from about 2 to about 5 microns. While the particles can be of any shape, they preferably are of relatively uniform size and shape. Generally spherical particles are most advantageously utilized in the method and products of the invention.

The binder material employed in the invention may be any liquid thermosetting resin having a viscosity sufficient to wet the surface of the filler material and yield a wetted solid prior to forming. The thermosetting resin compositions useful in this invention are flowable at a temperature beneath the temperature of thermal degradation of the resin and preferably have a viscosity at room temperature not greater than about 2,000 centipoises. Generally, as the viscosity of the resin is lowered for a given size of the inert filler particles, the porosity of the formed body is reduced. The viscosity of the resin and the size of the inert filler particles are somewhat complementary variables in regard to the porosity of the formed body. The larger the particle size, the lower the amount of porosity. Thus, resins in the lower portion of the viscosity range may be mixed with inert filler particles in the upper portion of the size range to achieve optimum properties in the formed body.

The thermosetting resin is mixed with the inert filler in an amount by volume which corresponds to an amount of from about 13 to about 28 percent by weight of the mixture when the inert filler is alumina.

A variety of thermosetting resins are satisfactory for use in this invention including epoxy resins, polyesters modified with styrene, phenolformaldehyde resins, urea-formaldehyde resins, urea-formaldehyde-furfuryl alcohol resins, urea-melamine resins, polycarbonate resins and the like.

Epoxy resins include the resins made from the reaction of epichlorhydrin with a bisphenol, such as 2, 2'-bis-(p-hydroxyphenyl-propane). The reaction can be run at elevated temperatures, e.g., about 60°C. in the presence of a suitable alkaline catalyst. Epoxy polymerizations generally can be carried out using a molar excess of epichlorhydrin. The resin is cured with a suitable hardener such as diamine, dibasic acid or the like. Other polyols such as glycerol, ethylene glycol and pentaerythritol as well as aromatic polyols can be reacted with epichlorhydrin to form epoxy resins.

Operable phenol-formaldehyde resins can be prepared by any of the prior art methods. For example, the components can be combined, generally with a molar excess of formaldehyde, in the presence of a suitable acid or alkaline catalyst. All or part of the phenol can be replaced with similar phenolic compounds such as cresol, xylenol, cresylic acid and mixtures thereof. Suitable alkaline catalysts include sodium and the other alkali metal hydroxides, amines, sodium carbonate, sodium bisulfite and the like. Suitable acid catalysts (including salts of strong acids) include ferric chloride, ammonium chloride, hydrochloric acid, phosphoric acid, oxalic acid, lactic acid and the like.

Operable urea-formaldehyde resins similarly may be prepared by any of the known prior art processes. For example, the components can be combined, generally with a molar excess of formaldehyde, under either acid or basic catalyst conditions. Preferred catalysts are acids or salts of strong acids. Urea-formaldehyde-furfuryl alcohol resins also can be prepared by known methods, such as by heating an agitated, heated mixture of urea, formaldehyde and furfuryl alcohol at pH greater than 7.0 until the desired condensation occurs.

Polyester resins include those formed from a polybasic acid such as an aliphatic polybasic acid (e.g., maleic, succinic, glutaric, adipic, pimelic, suberic, azelic, sebacic, diglycolic, fumaric, itaconic, citraconic, mesaconic, citric and the like) or an aromatic polybasic acid (e.g., phthalic, isophthalic, terephthalic, trimesic, diphenic and the like) and an alphatic polyhydroxy alcohol such as ethylene glycol, propylene glycol, sorbitol, pentaerythritol, arabitol and the like, as well as aromatic glycols such as o-xylene glycol, m-xylene glycol, p-xylene glycol and the like. Suitable catalysts, such as organic peroxides, e.g., benzoyl peroxide, methyl ethyl ketone peroxide, t-butyl peroxide and the like can be utilized. Methyl ethylketone peroxide is the preferred catalyst. Suitable polyester resins can be formed by the polymerization of lactones such as B-propiolactone.

Styrene-modified polyester resins are well known in the art. The polyester component (alkyd) is an unsaturated liner polyester condensation polymer of glycol residue combined through an ester linkage to a dibasic acid. The dibasic acid is commonly maleic. The glycol can be any suitable glycol such as 1, 2-propanediol. The alkyd and styrene are reacted in the presence of an organic peroxide compound catalyst. Peroxide catalysts such as benzoyl peroxide compound catalyst. Peroxide catalysts such as benzoyl peroxide, t-butyl peroxide, cumene hydroperoxide and the like commonly are used.

Polycarbonate resins also may be prepared by known reactions. These resins are polymeric combinations of bisphenols linked together through carbonate linkages. They are typically prepared by ester exchange between a diallyl carbonate and a dihydroxy aromatic compound or phosgenation of a dihydroxy aromatic compound.

It is preferred that the resin used undergoes sufficient amount of curing during the forming step to fix the particulate filler in uniform dispersion in the resin matrix and produce a self-supporting structure. The firing of a resin bonded material to cure at elevated temperatures, e.g., above about 125°F or more, can cause shrinkage and/or distortion and is to be avoided. Often, the pressure-curable resins used in the present invention will not require further heating to complete curing. When the resin does require a further treatment to complete curing, the resin-bonded piece can be treated as known in the art. Completion of curing can, for example, be accomplished by maintaining the partially-cured pieces at room temperature for a sufficient time to complete curing, e.g., from about 5 to 9 days depending on the amount and activity of the catalyst employed. Curing of the partially cured pieces also preferably is completed at a temperature of up to about 125°F. for about 2 to 4 days, again depending on the amount and activity of the hardener employed.

In accordance with the invention, the inert filler particles and resinous binder are mixed with the resin being present in the mixture in an amount by volume which corresponds to an amount of from about 13 to about 28 percent by weight of the mixture when the inert filler is alumina. Mixing may be satisfactorily conducted in a suitable mixing device such as a Hobart mixer. The particles and binder are mixed for a time sufficient to achieve a homogeneous mixture. Typically, the particles and binder are mixed for up to about 1 hour, preferably from about 5 to about 45 minutes. The mixer of filler and binder then is pressed with fluid pressure, e.g., isostatic pressing, to form the particular body desired. The use of the isostatic pressing imparts the requisite uniform porosity distribution throughout the pressed body with the majority of the pores being interconnected.

In the isostatic molding of an object having a definite shape, an image of the final object must be used as the surface upon which the resin-particle mix is formed. The image of the final piece must have sufficient strength to withstand deformation at molding pressures. The impression is placed in the bottom of a flexible bag, typically one made of rubber. The molding mixture then is poured into the bag covering the mold pattern to a depth sufficient to provide a finished piece of the desired thickness. Preferably, the molding mixture is poured on the image having a caudle arranged on the periphery to hold the proper amount of the mixture to ensure desired thickness of the piece. The image and molding material then are preferably wrapped in vinyl or other plastic sheeting to prevent sticking and placed in the flexible bag. The bag then is sealed, evacuated, and placed in an isostatic pressing chamber.

The isostatic pressing medium is generally water although other liquids such as oil or the like may be used. The isostatic pressing of the resin-particle mixture of the invention is generally conducted at ambient temperature, e.g., about 70°F. although pressing may be conducted at any temperatures below which thermal degradation of the resinous binder material will occur. Pressures in excess of about 300 p.s.i. have been found adequate but higher pressures may be employed if desired. Pressures of from about 300 to 1500 p.s.i. are preferred. Generally isostatic pressing will be conducted for a time of about 3 to about 6 hours at ambient temperatures, preferably from about 3.5 to 5 hours. As indicated, the resin used will preferably complete sufficient curing during the isostatic pressing step to give a self-supporting body. Thus the green strength of the body from the forming step is sufficient to permit the piece to be completely cured out of the isostatic pressing chamber either at ambient or higher temperatures below the point of thermal degradation of the resin. When the binder has undergone a significant amount of curing in the pressing chamber (as explained above), the completion of curing may be carried out without distortion. Heating of the isostatic pressing chamber is readily accomplished using equipment well known in the art.

A preferred filler material is alumina and a preferred binder is an epoxy resin which consists essentially of the condensation product of epichlorhydrin and a bisphenol anhydride and which may contain a minor amount of an inert non-migratory viscosity modifier.

The invention will be further described with reference to the following examples which are for illustrative purposes and are not to be considered limiting of the invention.

EXAMPLE 1

A mixture is made of 20 pounds of −325 mesh granular alumina having an average particle size of about 2 to 5 microns and about 23 percent by weight of the alumina of an epoxy resin (Ren RP–3202). The epoxy resin was prepared by reacting between 80 and 85 percent by weight of the reaction product of two mols of epichlorhydrin and one mol of bisphenol adduct with 15–20 percent by weight an inert non-migrator viscosity modifier using an adduct of 100 parts of a partial polymer of two mols of epichlorhydrin and one mol of bisphenol and 20 parts of ethylene diamine tetraacetate as a catalyst. The resulting resin has a viscosity of about 600 centipoises and an epoxy assay of between 170 and 185.

The epoxy resin and alumina are mixed in a Hobart mixer for about 5 minutes to achieve a homogeneous mixture. The mixture is then pressed in an isostatic pressing chamber at 1000 p.s.i. for 3½ hours to form a crucible liner for a crucible mold. The pressed liner then is cured at room temperature for 7 days. (In each of the following Examples, unless otherwise indicated, the pressed bodies are completely cured by holding the pressed body at room temperature for 7 days).

The formed, cured liner is used as a mold for the manufacture of crucibles in a die system similar to that shown in the Figure. The back face of the liner has a releasing unit applied in the form of a polymerizable thixotropic epoxy paste (Ren RP–1125 surface coat). The mold is backed up with a solid, non-porous mixture of the same epoxy resin as used in the die liner with sand and gravel.

The die liner is mounted in a standard hydraulic press and crucibles are pressed using this die in the manner explained above in regard to the operation of the die system of the Figure. The die is used to press over 500 pieces. Only slight wear is noted at this point indicating that at least another 200 acceptable crucibles still can be made with these molds. With customarily employed plaster dies, not more than an average of about 50 pieces can be pressed without replacing the die.

EXAMPLE 2

The resin and alumina particles of Example 1 are mixed in varying amounts. Each of the mixtures are mixed for about 5 minutes in a Hobart mixer to achieve homogenity and isostatically pressed at 1,000 p.s.i. for 3½ hours. A sample at each different amount of resin is cured to complete hardening by heating to 120°F. for 3 days while another, corresponding sample is cured by holding at room temperature for 7 days. The test bars are tested for percent porsity. The results are listed below in Table 1. As may be seen from this Table, the porosity for each particular resin-alumina mixture is essentially the same regardless of whether curing is completed at room temperature or under slight heating. Examination of the test bars shows that porosity is substantially uniformly distributed throughout each of the test bars.

TABLE 1

| Percent Resin | Cure | Average % Porosity |
|---|---|---|
| 28 | 120°F | 7.4 |
|  | Room | 6.5 |
| 26 | 120°F | 11.5 |
|  | Room | 11.8 |
| 24 | 120°F | 18.8 |
|  | Room | 18.6 |
| 22 | 120°F | 21.1 |
|  | Room | 15.8 |
| 20 | 120°F | 23.4 |
|  | Room | 23.4 |
| 18 | 120°F | 26.0 |
|  | Room | 26.6 |
| 16 | 120°F | 31.3 |
|  | Room | 31.9 |
| 14 | 120°F | 34.5 |
|  | Room | 34.7 |

EXAMPLE 3

Test bars are made in the same manner as Example 2 at an isostatic pressure of 500 p.s.i., and room temperature curing for 7 days. The alumina particles of Example 1 are used as the inert filler particulate material with varying amounts of the resin of Example 1 (Resin "A"). Other test bars are made under similar conditions utilizing two other resins.

Resin B is an epoxy resin (Ren RP–5010) which contains the reaction product of a bisphenol and epichlorhydrin catalyzed with an adduct of the partial polymer and ethylene diamine tetracetate. Resin C is also an epoxy resin (Ren RP–4002) containing the reaction product of epichlorhydrin and a bisphenol catalyzed with a hardener containing ethylene diamine tetra-acetate. The test bars are evaluated to determine the average percent porosity and the average modulus of rupture strength for each resin-particulate mixture. The results are listed below in Table 2. Examination of the test bars shows that the porosity is substantially uniformly distributed throughout the bars.

TABLE 2

| Resin | % Resin | Average M.O.R. p.s.i. | Average % Porosity |
|---|---|---|---|
| A | 18 | 1710 | 28.8 |
|  | 20 | 1850 | 26.4 |
|  | 22 | 1912 | 25.1 |
|  | 24 | 2070 | 21.8 |
|  | 26 | 2137 | 18.3 |
|  | 28 | 2587 | 14.3 |
| B | 22 | 3397 | 14.8 |
|  | 24 | 3397 | 12.3 |
|  | 26 | 4365 | 6.1 |
|  | 28 | 4635 | 0.9 |
| C | 16 | 1080 | 29.1 |
|  | 18 | 1600 | 29.1 |
|  | 20 | 2092 | 25.4 |
|  | 22 | 2385 | 18.3 |
|  | 24 | 3532 | 15.1 |

Although the test bodies made with Resin B show very high strength characteristics, the porosity of each of the pieces made with Resin B is very low and generally unsuitable for use in dies, molds, or filtering devices. Bodies having porosities too low do not have sufficient interconnecting porosity to allow compressed fluid to release pressed pieces in the molding system described above. Bodies having porosities too high lack sufficient strength to be utilizable in pressure molding systems. However highly porous bodies made by the process of this invention may have utility in particular applications where no substantial strength is required, as for example, in filtering systems. As this Example illustrates, increasing amounts of resin yields bodies of increasing structural strength and decreasing porosity.

EXAMPLE 4

The alumina particles of Example 1 are mixed with 16 and 19 weight percent of the epoxy resin of Example 1. The resin-alumina mixture is isostatically pressed at 500 p.s.i. for 3 hours to form bars.

The test bars of 16 and 19 weight percent resin show 29.8 and 24.8 percent porosity, respectively, and 1426 p.s.i. and 2070 p.s.i. modulus of rupture, respectively.

Mold liners are made from each of these respective mixtures in the same manner as the test bars for use in the pressing of ceramic mixtures in molding arrangements similar to that shown in FIG. 1. Each of the mold liners perform satisfactory.

EXAMPLE 5

Example 4 is repeated at an isostatic pressure of 1000 p.s.i.

The test bars of 16 and 19 weight percent resin show 28.3 and 23.1 percent porosity, respectively and 1656 p.s.i. and 2475 p.s.i. modulus of rupture, respectively.

EXAMPLE 6

Jiggering molds are made of a mixture of alumina having an average particle size of 2–5 microns and 17 percent by weight of the resin of Example 1. The jiggering molds are formed at an isostatic pressure of 1000 p.s.i. These jiggering molds are used in the manufacture of dinnerware from a standard dinnerware body mix (e.g., containing ball clay, kaolin, flint, feldspar and the like). The molds in use perform as well or better than standard commercial jiggering molds.

EXAMPLE 7

The resin and alumina particles of Example 4 are mixed in amounts of 10, 13, 16 and 19 weight percent resin and isostatically pressed at 2,500 p.s.i. and 5000 p.s.i. The test bars are examined for porosity and strength. The results are shown below in Table 3.

TABLE 3

| % Resin | Isostatic pressure p.s.i. | % Porosity | M.O.R., p.s.i. |
| --- | --- | --- | --- |
| 10 | 2500 | | |
| 13 | 2500 | | |
| 16 | 2500 | 28.2 | 1730 |
| 19 | 2500 | 23.5 | 2910 |
| 10 | 5000 | | |
| 13 | 5000 | | 1380 |
| 16 | 5000 | 25.5 | 2127 |
| 19 | 5000 | 21.0 | 2470 |

The samples containing 10 percent resin do not form into test bars at either 2500 or 5000 p.s.i. The 13 percent resin test bar (2500 p.s.i.) formed a very weak test bar unsuitable for further testing.

EXAMPLE 8

Samples are made with −325 mesh alumina particles having a median particle size of about 10 to 15 microns with 19 weight percent of the epoxy resin of Example 1. The samples are mixed for 5 minutes in a Hobart mixer and isostatically pressed at 1000 p.s.i. for 3½ hours. The test bars average 5.6 percent porosity and 4898 p.s.i. modulus of rupture.

EXAMPLE 9

Example 8 is repeated with −100 mesh alumina particles having a median particle size of about 60 to 65 microns. The test bars average 0.3 percent porosity and 8766 p.s.i. modulus of rupture.

EXAMPLE 10

The resin of Example 1 is mixed with −325 mesh powdered iron particles in amounts of 6, 10, and 14 percent by weight of the resin. The mixtures are isostatically pressed into test bars at 1000 p.s.i. for 3½ hours.

The test bars containing 6, 10 and 14 percent resin show porosities of 36.3, 25.3 and 11.8 percent, respectively, and modulus of ruptures of 1421 p.s.i., 2756 p.s.i. and 3668 p.s.i., respectively.

Stamping molds are made from these mixtures in the same manner as the test bars and perform satisfactorily in use.

EXAMPLE 11

Mixtures are made of flint particles with 16, 19 and 22 weight percent of the resin of Example 1. The flint particles have a median particle size of about 20 microns and a size distribution of from about 2 to about 100 microns. The mixtures are isostatically pressed into test bars at 1000 p.s.i. for 3½ hours.

The test bars of 16, 19 and 22 percent resin show porosities of 26.1, 21.3 and 15.6 percent, respectively, and modulus of ruptures of 1523, 2193 and 2747 p.s.i., respectively.

A mold liner is made from a flint − 16 percent mixture in the same manner as the test bars. The mold liner is used in a ceramic molding die system such as shown in FIG. 1. The resin bonded flint mold liner performs satisfactorily in use.

EXAMPLE 12

Mixtures are made of the alumina of Example 4 with 16 and 19 weight percent of a polyester resin. The polyester resin (Glidpol 4732) is an unsaturated polyester resin of propylene glycol, maleic anhydride, phthalic anhydride and a styrene monomer with 2 percent methyl ethyl ketone peroxide as a hardener.

The mixtures are isostatically pressed into test bars at 1000 p.s.i. for 3 hours. The test bars containing 16 and 19 percent resin show 27.4 and 21.3 percent porosity, respectively. The 16 percent test bar was very fragile and unsuitable for strength testing. The 19 percent test bar had a modulus of rupture of 1855 p.s.i.

EXAMPLE 13

The resin of Example 1 is mixed in varying amounts with Yellowstone Talc having an average particle size of about 10 microns or less. The resin and talc are difficult to mix. Mixtures containing less than about 22 weight percent of the epoxy resin do not contain sufficient resin to form a flowable mixture. Mixtures containing 22, 26 and 30 weight percent of the epoxy resin are isostatically pressed into test bars at 1000 p.s.i. for 3 hours.

The test bars made do not have sufficient strength for testing. Porosity is not determined.

EXAMPLE 14

A mixture is made of finely divided carbon and 20 percent by weight of the resin of Example 1. The carbon particles are too light and difficult to disperse. No test bars are made.

EXAMPLE 15

A vacuum-forming mold is made from the composition and in the manner of Example 1. The mold is used in the vacuum-forming of acrylic sheeting.

One face of the mold is formed with an image of the final object. The back surface of the mold is provided with a suitable connection to a suitable vacuum line. Suction is applied through the vacuum line through the mold to draw the acrylic sheet against the mold face. The mold is found to be a satisfactory vacuum-forming mold.

The foregoing description and examples have been presented for illustrative purposes. Since other embodiments will be apparent to those skilled in the art, the invention is to be limited only by the scope of the appended claims.

It is claimed:

1. An isostatically pressed, porous, rigid body comprising particulate inert filler bonded by a cured thermosetting resin, said inert filler particles having a Moh hardness greater than about two, said resin being in uniform admixture with said inert filler and present in the mixture in an amount by volume which corresponds to an amount of from about 13 to about 23 percent by weight of the mixture when the inert filler is alumina, said body having from about 15 to 40 percent porosity substantially uniformly distributed therethrough, said porosity being substantially interconnected throughout said body such that a fluid may be made to permeate therethrough.

2. The body of claim 1 wherein said particles have an average particle diameter of from about 2 to about 5 microns.

3. The body of claim 1 wherein the filler particles are selected from the group consisting of metal and metalloid salts and oxides, metals, alloys and ceramic materials.

4. The body of claim 3 wherein the particles are a metal oxide.

5. The body of claim 1 wherein the thermosetting resin binder is taken from the group consisting of epoxy resins, phenol-formaldehyde resins, urea-formaldehyde resins, polyester resins, polyesters modified with sytrene, urea-formaldehyde — furfuryl alcohol resins, urea-melamine resins and polycarbonate resins.

6. The body of claim 5 wherein the thermosetting resin is an epoxy resin.

7. The body of claim 1 wherein the thermosetting resin completes a sufficient amount of curing in from 3 to 6 hours at about ambient temperature under about 300 p.s.i. pressure to become self-supporting.

8. A mold made of the body of claim 1

9. A jiggering mold made of the body of claim 1.

10. The porous, rigid body of claim 3 wherein said inert filler is alumina.

11. The porous, rigid body of claim 6 wherein said inert filler is alumina.

* * * * *